United States Patent
Shin et al.

(10) Patent No.: US 9,109,153 B2
(45) Date of Patent: Aug. 18, 2015

(54) METHOD FOR MANUFACTURING A NANOPARTICLE, METHOD FOR MANUFACTURING A LIGHT-EMITTING ELEMENT HAVING THE NANOPARTICLE, AND METHOD FOR MANUFACTURING A DISPLAY SUBSTRATE HAVING THE NANOPARTICLE

(75) Inventors: Jung-Han Shin, Yongin-si (KR); Jae-Byung Park, Seongnam-si (KR); Hae-Il Park, Seoul (KR); Jin-Seob Byun, Seoul (KR); Hyoung-Joo Kim, Uiwang-si (KR); Sung-Jee Kim, Pohang-si (KR); Sahid Hussain, Pohang-si (KR); Ji-Won Bang, Pohang-si (KR)

(73) Assignees: SAMSUNG DISPLAY CO., LTD. (KR); POSTECH ACADEMY INDUSTRY FOUNDATION (KR)

( * ) Notice: Subject to any disclaimer, the term of this patent is extended or adjusted under 35 U.S.C. 154(b) by 994 days.

(21) Appl. No.: 12/545,747

(22) Filed: Aug. 21, 2009

(65) Prior Publication Data
US 2010/0129529 A1     May 27, 2010

(51) Int. Cl.
| | | |
|---|---|---|
| C23C 18/00 | (2006.01) | |
| C09K 11/02 | (2006.01) | |
| B82Y 30/00 | (2011.01) | |

(Continued)

(52) U.S. Cl.
CPC ............ *C09K 11/02* (2013.01); *B82Y 30/00* (2013.01); *C01B 19/007* (2013.01); *C01B 25/087* (2013.01); *C01G 3/00* (2013.01); *C01G 5/00* (2013.01); *C01G 7/00* (2013.01); *C01G 9/08* (2013.01); *C01G 11/02* (2013.01); *C01G 15/00* (2013.01); *C01G 55/00* (2013.01); *C09K 11/565* (2013.01); *C09K 11/703* (2013.01); *C09K 11/883* (2013.01); *H05B 33/14* (2013.01); *C01P 2002/84* (2013.01); *C01P 2004/03* (2013.01); *C01P 2004/64* (2013.01); *C01P 2004/84* (2013.01)

(58) Field of Classification Search
USPC .......................................................... 427/226
See application file for complete search history.

(56) References Cited

U.S. PATENT DOCUMENTS

| | | | | |
|---|---|---|---|---|
| 5,246,116 | A | * | 9/1993 | Kirk ................................. 209/3 |
| 2003/0087338 | A1 | * | 5/2003 | Messersmith et al. ....... 435/68.1 |

(Continued)

FOREIGN PATENT DOCUMENTS

| | | |
|---|---|---|
| JP | 2005-187314 | 7/2005 |
| KR | 1020070052047 | 5/2007 |

(Continued)

OTHER PUBLICATIONS

European Search Report corresponding to EP 09011361.4-2111, dated Jan. 12, 2010, 6 pages.

(Continued)

*Primary Examiner* — Robert Vetere
(74) *Attorney, Agent, or Firm* — Innovation Counsel LLP (57) ABSTRACT

In a method for manufacturing a nanoparticle, a precursor (e.g., transition metal complex) mixed with polyethylene glycol (PEG) is thermally decomposed. A nanoparticle is formed from the thermal decomposition. PEG is cost effective and less toxic than chemicals that are conventionally used for nanoparticle production, so that costs for manufacturing the nanoparticle may be decreased. Further, PEG may be reused to produce more nanoparticles.

15 Claims, 7 Drawing Sheets

(51) Int. Cl.

| | | |
|---|---|---|
| *C01B 19/00* | (2006.01) | |
| *C01B 25/08* | (2006.01) | |
| *C01G 3/00* | (2006.01) | |
| *C01G 5/00* | (2006.01) | |
| *C01G 7/00* | (2006.01) | |
| *C01G 9/08* | (2006.01) | |
| *C01G 11/02* | (2006.01) | |
| *C01G 15/00* | (2006.01) | |
| *C01G 55/00* | (2006.01) | |
| *C09K 11/56* | (2006.01) | |
| *C09K 11/70* | (2006.01) | |
| *C09K 11/88* | (2006.01) | |
| *H05B 33/14* | (2006.01) | |

(56) References Cited

U.S. PATENT DOCUMENTS

2004/0007169 A1* 1/2004 Ohtsu et al. ............... 117/84
2004/0250745 A1 12/2004 Ogura et al.
2005/0206311 A1* 9/2005 Bechtel et al. ............. 313/506
2006/0011890 A1* 1/2006 Isobe ....................... 252/301.36
2006/0043361 A1* 3/2006 Lee et al. ...................... 257/40
2006/0086925 A1 4/2006 Hirai et al.
2007/0056893 A1* 3/2007 Noh et al. ................. 210/321.61
2008/0160306 A1* 7/2008 Mushtaq et al. ............. 428/402

FOREIGN PATENT DOCUMENTS

KR 1020080017149 2/2008
WO 2004096714 A1 11/2004

OTHER PUBLICATIONS

English Abstract for JP Pat. Pub. No. 2005-187314.
English Abstract for KR Pat. Pub. No. 1020070052047.
English Abstract for KR Pat. Pub. No. 1020080017149.

* cited by examiner

METHOD FOR MANUFACTURING A NANOPARTICLE, METHOD FOR MANUFACTURING A LIGHT-EMITTING ELEMENT HAVING THE NANOPARTICLE, AND METHOD FOR MANUFACTURING A DISPLAY SUBSTRATE HAVING THE NANOPARTICLE

PRIORITY STATEMENT

This application claims priority under 35 U.S.C §119 to Korean Patent Application No. 10-2008-0118717 filed on Nov. 27, 2008 in the Korean Intellectual Property Office (KIPO), the contents of which are herein incorporated by reference in their entirety.

BACKGROUND OF THE INVENTION

1. Field of the Invention

The invention relates to a method of manufacturing a nanoparticle, a method of manufacturing a light-emitting element with the nanoparticle, and a method of manufacturing a display substrate using the nanoparticle. More particularly, the invention relates to a method of manufacturing a nanoparticle that emits light, a method for manufacturing a light-emitting element having the nanoparticle, and a method for manufacturing a display substrate having the nanoparticle.

2. Description of the Related Art

Generally, in the field of nanotechnology, a material or a device is made using nanosize particles (nanoparticles). "Nanoparticles," as used herein, are particles having size parameters (such as length, height, diameter, width, etc.) in a nanometer range, and nanotechnology may include a method for manufacturing the material or the device as well as the material or device itself. A "nanometer range" covers about 1 nm to about 100 nm.

The nanoparticles may be zero-dimensional (0D), one-dimensional (1D), two-dimensional (2D), etc. A 0D nanoparticle may include a quantum dot, a 1D nanoparticle may include a nanowire, a nanopipe, etc., and a 2D nanoparticle may include a nanodisc.

In nanotechnology, a quantum dot may have different kinds of optical, electrical and/or magnetic properties compared to the bulk material. Furthermore, a quantum dot's optical, electrical, and/or magnetic properties may change with the size or the shape of the quantum dot. The quantum dot having the above-mentioned characteristics is used in manufacturing a silicon semiconductor or a thin metal layer, etc., so that technical limitations in manufacturing the silicon semiconductor or the thin metal layer may be overcome.

The quantum dot is usually formed via a lithographic process or a gas-liquid-solid phase growth process using a catalyst, using an expensive apparatus. Today, quantum dots may be formed in a solution. For example, quantum dots may be formed using a solution that includes octadecene, trioctylphosphine oxide, etc.

However, the above-mentioned solutions are relatively expensive, increasing the cost for manufacturing the quantum dot. In addition, octadecene and trioctylphosphine oxide are usually discarded after being used, introducing pollutants to the environment.

SUMMARY OF THE INVENTION

The present invention provides a method for manufacturing a nanoparticle capable of improving the productivity of the nanoparticle, a method for manufacturing a light-emitting element having the nanoparticle, and a method for manufacturing a display substrate having the nanoparticle.

According to one aspect of the present invention, a method for manufacturing a nanoparticle is provided. The method includes mixing a precursor with polyethylene glycol (PEG) to form a first mixture, and thermally decomposing the first mixture.

The PEG may have a weight average molecular weight in a range of about 1,500 to about 4,000.

In thermally decomposing the precursor, the first mixture may be agitated at a temperature in a range of about 100° C. to about 300° C.

After forming the nanoparticle, the PEG in which the nanoparticle is formed may be mixed with a hydrophobic solution having a higher hydrophobicity than PEG. Solid-state PEG may be separated from the nanoparticle by precipitation.

PEG mixed with the precursor may be collected via transforming a phase of solid-state PEG.

The hydrophobic solution may include hexane, chloroform, cyclohexane, etc.

A second transition metal complex may be mixed with the first mixture. The second transition metal complex may be thermally decomposed in PEG to form an outer layer on a surface of the nanoparticle, the outer layer including a second transition metal of the second transition metal complex.

The nanoparticle may include transition metal oxide, transition metal sulfide, transition metal selenide, transition metal telluride, transition metal nitride, transition metal phosphide, transition metal arsenide, etc.

According to one aspect of the present invention, a method for manufacturing a light-emitting element is provided. The method includes mixing a precursor mixed with PEG to form a first mixture and thermally decomposing the first mixture to form a nanoparticle. A first electrode layer may be formed on a substrate. A light-emitting layer may be formed on the substrate including the first electrode, the light-emitting layer having the nanoparticle. A second electrode layer may be formed on the light-emitting layer.

According to one aspect of the present invention, a method for manufacturing a display substrate is provided. In method, a precursor mixed with PEG may be thermally decomposed to form a nanoparticle. A color layer may be formed in a pixel area of a substrate, the color layer having the nanoparticle.

According to the present invention, a nanoparticle may be formed using PEG as a solvent. PEG is cheap and less toxic, and PEG used in forming the nanoparticle may be recycled. Thus, costs for manufacturing the nanoparticle may be decreased and the productivity of the nanoparticle may be improved.

In addition, the nanoparticle formed in PEG may be used in a method for manufacturing a light-emitting element and a display substrate, and thus the productivity of the light-emitting element and the display substrate may be improved.

BRIEF DESCRIPTION OF THE DRAWINGS

The above and other features and advantages of the present invention will become more apparent by describing in detailed embodiments thereof with reference to the accompanying drawings.

DETAILED DESCRIPTION OF THE INVENTION

The present invention is described more fully hereinafter with reference to the accompanying drawings, in which exemplary embodiments of the present invention are shown. The present invention may, however, be embodied in many different forms and should not be construed as limited to the exemplary embodiments set forth herein. These embodiments are provided to complete the disclosure and convey the scope of the invention to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular an embodiment only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-sectional illustrations that are schematic illustrations of idealized embodiments (and intermediate structures) of the present invention. As such, variations from the shapes of the illustrations as a result, for example, of manufacturing techniques and/or tolerances, are to be expected. Thus, example embodiments of the present invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
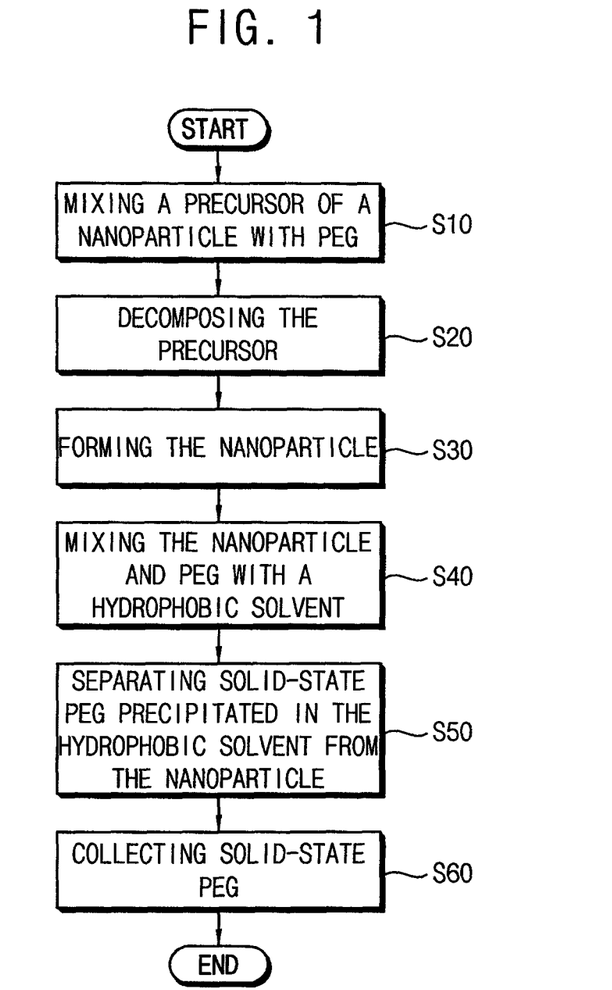
FIG. 1 is a flowchart illustrating a method for manufacturing a nanoparticle according to an embodiment of the present invention.

FIG. 1 is a flowchart illustrating a method for manufacturing a nanoparticle according to an embodiment of the present invention.

Referring to FIG. 1, a precursor for forming a nanoparticle is mixed with polyethylene glycol (PEG) (step S10) to form a first mixture.

PEG may be a compound including a chain and a couple of alcohol functionalities (—OH) coupled to respective ends of the chain. The chain may include ethylene oxide (—$CH_2CH_2O$—) as a repeating unit. When the weight average molecular weight of PEG is less than about 1,500, PEG may not have native physical and/or chemical characteristics of the compound. When the weight average molecular weight of PEG is greater than about 4,000, the melting point of PEG may be increased and the precursor becomes difficult to mix with PEG. Thus, the weight average molecular weight of PEG may be in a range between about 1,500 to about 4,000.

The precursor may include a transition metal complex. The transition metal complex may include a transition metal which forms the nanoparticle. Examples of suitable transition metals include gold (Au), silver (Ag), platinum (Pt), palladium (Pd), cobalt (Co), copper (Cu), molybdenum (Mo), zinc (Zn), cadmium (Cd), mercury (Hg), gallium (Ga), indium (In), tin (Sn), lead (Pb), etc. These substances may be used alone or in a mixture. Examples of a material that may be used for the transition metal complex include indium acetate, diethyl zinc, cadmium acetate, etc.

The transition metal complex may be mixed with PEG after being dissolved in a first solvent to facilitate the transition metal complex's mixing with PEG The solution formed using the first solvent and the transition metal complex may be mixed with PEG. Examples of a material that may be used for the first solvent may include myristic acid, oleic acid, oleyl amine, etc.

An organic compound may be further mixed with PEG after mixing the precursor with PEG. Examples of a material that may be used for the organic compound may include oxide, sulfide, selenide, telluride, nitride, phosphide, arsenide, etc. Particular examples of a material that may be used for the organic compound may include tris(trimethylsilyl)phosphine, bis(trimethylsilyl)sulfide, etc.

In addition, the organic compound may be mixed with PEG after being dissolved in a second solvent in order to be easily mixed with PEG The organic compound and the second solvent may be mixed with PEG Examples of a material that may be used for the second solvent may include trioctylphosphine (TOP), etc.

The precursor which is mixed with PEG may be thermally decomposed (step S20).

The precursor mixed with PEG of the first mixture may be agitated at about 100° C. to about 300° C. to be thermally decomposed. Where one or more organic compound was added, the organic compound mixed with the precursor and PEG is agitated.

When an agitating temperature is less than about 100° C., the provided energy level may not be sufficient for decomposition of the precursor, possibly resulting in complete decomposition of the precursor. On the other hand, when the agitating temperature is greater than about 300° C., PEG may decompose or non-essential reactions may be generated due to excessive heat, decreasing the reliability in the thermal decomposition of the precursor. Thus, the temperature for the thermal decomposition of the precursor is preferably in a range between about 100° C. to about 300° C.

The transition metal which is formed from the precursor may independently exist in PEG, via thermal decomposition of the precursor.

The nanoparticle is formed via thermally decomposing the precursor in PEG (step S30).

For example, the transition metal which is formed from the precursor may form the nanoparticle. The nanoparticle may include gold (Au), silver (Ag), platinum (Pt), palladium (Pd), cobalt (Co), copper (Cu), molybdenum (Mo), indium phosphide (InP), cadmium selenide (CdSe), copper indium selenide ($CuInSe_2$), copper indium sulfide ($CuInS_2$), gold indium sulfide ($AgInS_2$), etc.

Although not shown in figures, after forming the nanoparticle, an outer layer of the nanoparticle may be formed on a surface of the nanoparticle. In this case, the outer layer may be formed by adding a transition metal complex including a different transition metal and the transition metal of the nanoparticle to PEG which is mixed with the nanoparticle, as a second mixture. Thus, the nanoparticle having a core-shell structure may be formed by the first mixture and the second mixture. Hereinafter, the transition metal of the nanoparticle is referred to as "a first transition metal" and the different transition metal of the outer layer is referred to as "a second transition metal." For example, the nanoparticle may be formed from the transition metal complex as the precursor which includes the first transition metal. The nanoparticle may be defined as the "core" of the core-shell structure. The outer layer may include the second transition metal and be defined as the "shell" of the core-shell structure.

For example, a second transition metal complex having the second transition metal may be mixed with PEG which is mixed with the nanoparticle. The second transition metal may be different from the first transition metal. Examples of the second transition metal include gold (Au), silver (Ag), platinum (Pt), palladium (Pd), cobalt (Co), copper (Cu), molybdenum (Mo), zinc (Zn), cadmium (Cd), mercury (Hg), gallium (Ga), indium (In), tin (Sn), lead (Pb), etc. These may be used alone or in a mixture.

Then, the second transition metal complex may be thermally decomposed in PEG which is mixed with the nanoparticle to form a thermally decomposed material. The thermally decomposed material may form the outer layer including the second transition metal. The outer layer may be formed on a surface of the nanoparticle. A process for thermally decomposing the second transition metal complex is substantially the same as that for thermally decomposing the first transition metal complex. Thus, any further repetitive description concerning the above process will be omitted.

In addition to the second transition metal complex, an organic compound may be further added to PEG mixed with the nanoparticle. The organic compound added to PEG with the second transition metal complex is substantially the same as or similar to the organic compound added to PEG with the first transition metal complex. Thus, any further repetitive description concerning the above element will be omitted.

Hereinafter, the "nanoparticle" is defined to include a nanoparticle having the first transition metal and having a core and an outer layer. In this case, the core includes the first transition metal, and the outer layer includes the second transition metal and surrounds the core.

PEG and the nanoparticle are mixed with a hydrophobic solvent (step S40).

The hydrophobic solvent may include a material having a higher hydrophobicity than PEG. Examples of a material that may be used for the hydrophobic solvent include hexane, chloroform, cyclohexane, etc. In the hydrophobic solvent and PEG the hydrophobic solvent may have hydrophobic characteristics and PEG may have hydrophilic characteristics compared to the hydrophobic solvent. The hydrophobic solvent may have the higher hydrophobicity than PEG, and thus PEG may not dissolve in the hydrophobic solvent. Thus, PEG precipitates out of the hydrophobic solvent to form solid-state PEG.

Before mixing PEG and the nanoparticle with the hydrophobic solvent, PEG and the nanoparticle may be cooled to a temperature that is lower than that for thermal decomposition. PEG and the nanoparticle may be cooled at a temperature between about 50° C. to about 70° C.

The size of the nanoparticle may be controlled by controlling the time period between thermal decomposition process and the process for mixing PEG with the hydrophobic solvent. Specifically, the longer this time period is, the larger the size of the nanoparticle will be. The size of the nanoparticle may depend on the size of the core and/or thickness of the outer layer. For example, the larger the size of the core is and/or the thicker the outer layer, the larger the overall size of the nanoparticle will be.

Then, solid-state PEG which is precipitated in the hydrophobic solvent is separated from the nanoparticle (step S50).

The solid-state PEG may be phase-separated from the hydrophobic solvent. For example, the solid-state PEG may remain in a first container after pouring the hydrophobic solvent into a second container different from the first container. The nanoparticle may be dissolved in the hydrophobic solvent, and thus the nanoparticle may be moved into the second container with the hydrophobic solvent when pouring the hydrophobic solvent into the second container.

Solid-state PEG is collected after phase-transforming solid-state PEG which is separated from the nanoparticle and the hydrophobic solvent (step S60).

In more detail, solid-state PEG may be heated to transform solid-state PEG into liquid-state PEG. The liquid-state PEG may be substantially the same as PEG used in the initial step for manufacturing the nanoparticle. Thus, the liquid-state PEG may be reused for manufacturing the nanoparticle. For example, the precursor of the nanoparticle may be mixed with the liquid-state PEG to be used again in manufacturing more nanoparticles.

The nanoparticle dissolved in the hydrophobic solvent may be separated from the hydrophobic solvent by removing the hydrophobic solvent from the second container. For example, the hydrophobic solvent may be removed from the second container by vaporizing the hydrophobic solvent.

In addition, after separating the nanoparticles from the hydrophobic solvent, the nanoparticles may be centrifuged to be divided according to size.

According to the method for manufacturing the nanoparticle in the present embodiment, the nanoparticle may be formed using PEG as a solvent which is cheap and less toxic. An added benefit of the method described above is that PEG used in forming the nanoparticle may be recycled or reused. Thus, manufacturing cost may be decreased and the productivity of the nanoparticle may be improved.

Hereinafter, the method for manufacturing the nanoparticle will be illustrated through the following embodiments.

EXAMPLE 1

Manufacturing Cadmium Selenide (CdSe)

After mixing about 0.2 mmol of cadmium acetate with 1 mL of oleic acid to form a mixing solution, the mixing solution was agitated in a vacuum condition at a temperature of about 100° C., for about 1 hour. About 1 mL of trioctylphosphine (TOP) and a shot of 0.8 mmol selenium were mixed with an agitated mixing solution to form a precursor of CdSe.

Then, after heating about 4 g of PEG (the weight average molecular weight of which about 3,350) and 1 mL of oleyl amine in a nitrogen gas condition and a temperature of about 200° C. for about 1 minute to about 1 hour, the precursor of CdSe was added in the above solution including PEG and oleyl amine to manufacture CdSe having an average diameter of about 4 nm.

Obtained products were cooled at a temperature of about 60° C., and hexane was added to the obtained products to separate solid-state PEG by precipitation.

Figure 2A:
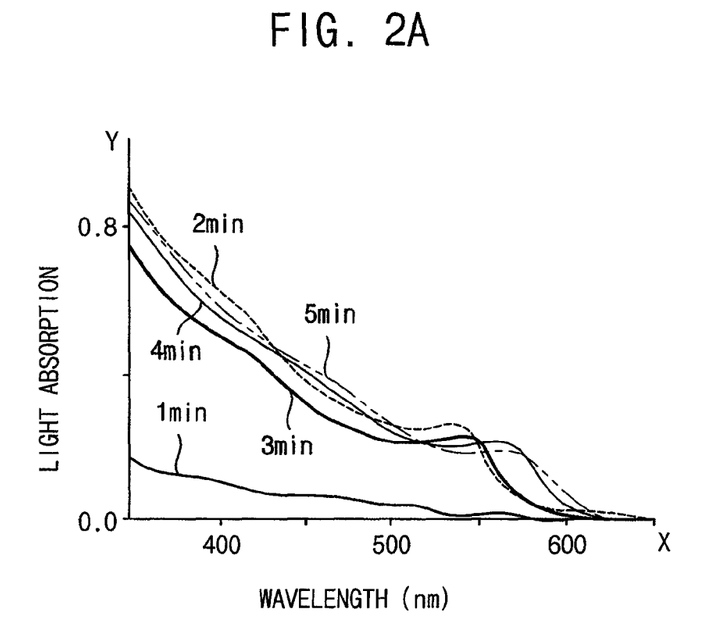
FIGS. 2A and 2B are graphs illustrating characteristics of the nanoparticles produced according to Example 1.
Figure 2B:
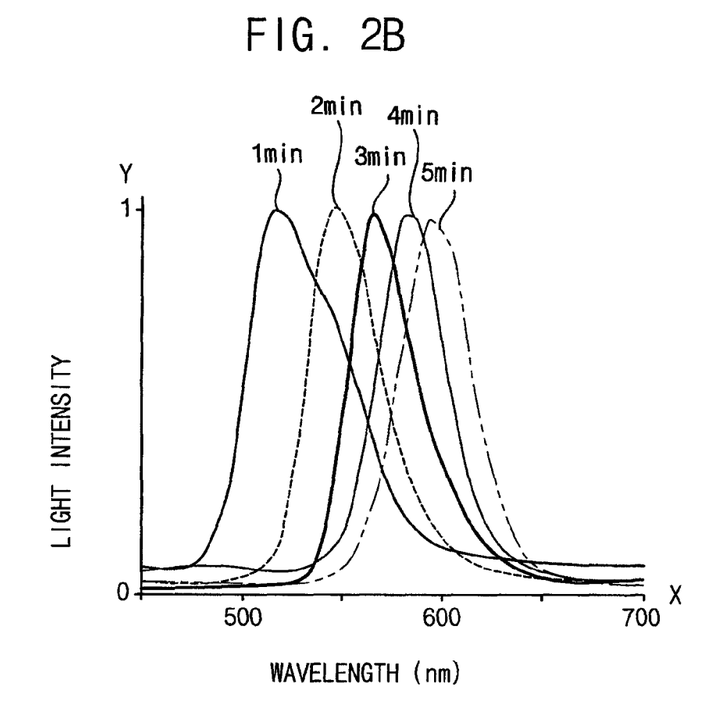

FIGS. 2A and 2B are graphs illustrating characteristics of the nanoparticles according to Example 1.

FIG. 2A represents light absorption of CdSe in PEG as a function of wavelength when reaction time is about 1 minute, about 2 minutes, about 3 minutes, about 4 minutes, about 5 minutes, about 6 minutes, and about 7 minutes. In FIG. 2A, the x-axis represents the wavelength (nanometers, nm). The y-axis represents relative light absorption which has a maximum value "1" and a minimum value "0". The reaction time indicates a period in which the precursor of CdSe reacts in PEG after the precursor is added to PEG.

Referring to FIG. 2A, the wavelength at which light absorption is about 0 increases as the reaction time passes from about 1 minute to about 5 minutes. When the reaction time is about 1 minute, the light absorption is about 0 at the wavelength of about 580 nm. When the reaction time is about 2 minutes, the light absorption is about 0 at the wavelength of about 600 nm. When the reaction time is about 5 minutes, the light absorption is about 0 at the wavelength of about 630 nm.

FIG. 2B represents light (photoluminescence) intensity of CdSe in PEG according to the wavelength when the reaction time is about 1 minute, about 2 minutes, about 3 minutes, about 4 minutes, about 5 minutes, about 6 minutes, and about 7 minutes. In FIG. 2B, the x-axis represents the wavelength (nanometers, nm). The y-axis represents relative intensity of emitted light which has a maximum value "1" and a minimum value "0".

Referring to FIG. 2B, the wavelength at which the light intensity is about 1 increases as the reaction time increases from about 1 minute to about 5 minutes. When the reaction time is about 1 minute, the light intensity is about 1 at the wavelength of about 500 nm. When the reaction time is about 2 minutes, the light intensity is about 1 at the wavelength of about 540 nm. When the reaction time is about 3 minutes, the light intensity is about 1 at the wavelength of about 580 nm. When the reaction time is about 5 minutes, the light intensity has about 1 at the wavelength of about 600 nm.

Referring to FIGS. 2A and 2B, a nanoparticle formed in PEG absorbs and emits light of longer wavelength as the reaction progresses. The size of the nanoparticle may grow large, as the reaction time passes. The nanoparticle may represent a blue color corresponding to the short wavelength to a red color corresponding to the long wavelength, as the size of the nanoparticle is increased.

EXAMPLE 2

Manufacturing Indium Phosphide/Zinc Sulfide (InP/ZnS)

After preparing a mixing solution including indium acetate of about 0.4 mmol and myristic acid of about 1.7 mmol with PEG (the weight average molecular weight of about 3,350) of about 4 g, the mixing solution and PEG were agitated in a nitrogen condition which had a temperature of about 120° C., for about 1 hour. The agitated product was mixed with tris (trimethylsilyl)phosphine of about 0.2 mmol dispersed in TOP of about 0.5 ml at a temperature of about 180° C. to form a precursor of indium phosphide (InP). The precursor of InP was heated at a temperature of about 180° C. for about 3 minutes, and thus InP having the diameter of about 3.7 was formed.

Then, after a mixture including 0.3 mmol of diethyl zinc dispersed in 1 mL TOP and about 0.3 mmol bis-(trimethylsilyl)sulfide were dropped in the above products which included InP and PEG at a temperature of about 120° C., the above products including the mixture, InP and PEG were agitated and heated at a temperature of about 200° C., for about 1 hour. Thus, InP/ZnS including ZnS was formed. ZnS surrounded InP as and InP/ZnS had the diameter of about 5.1 nm.

The above products including InP/ZnS and PEG were cooled at a temperature of about 60° C., and hexane was added to the obtained products to separate solid-state by precipitation.

Figure 3A:
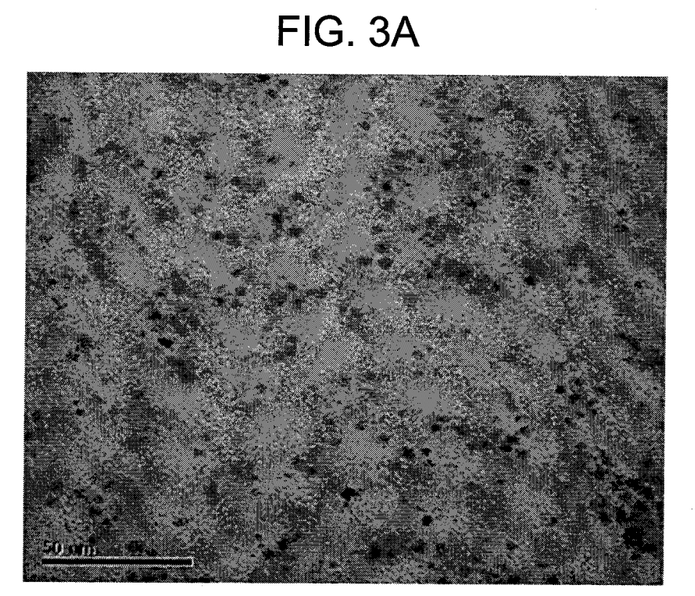
FIGS. 3A and 3B are images showing the nanoparticles produced according to Example 2.
Figure 3B:
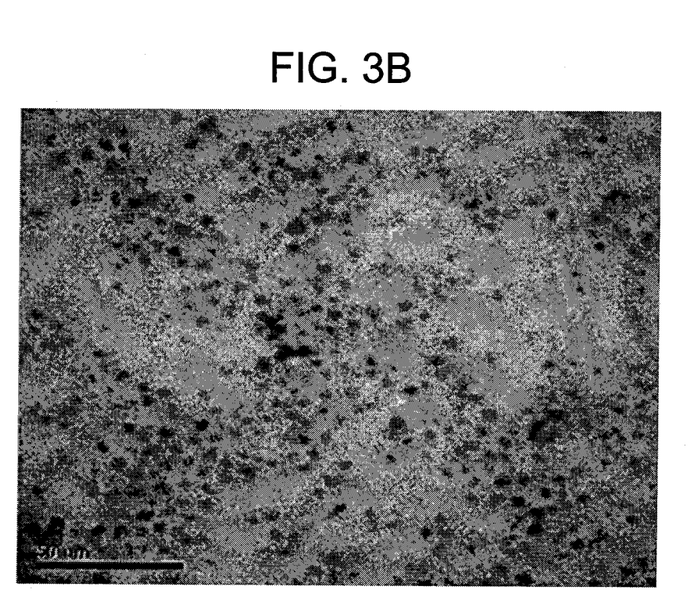

FIGS. 3A and 3B are images showing the nanoparticles prepared according to Example 2.

For example, FIG. 3A is an image of InP formed in PEG, and the image was taken by a transmitting electron microscope. FIG. 3A shows that InP having a diameter of about 3.7 nm may be formed in PEG.

FIG. 3B is an image of InP/ZnS formed in PEG, and the image was taken by the transmitting electron microscope. In FIG. 3B, InP/ZnS having the diameter of about 5.1 nm may be formed in PEG.

Figure 4A:
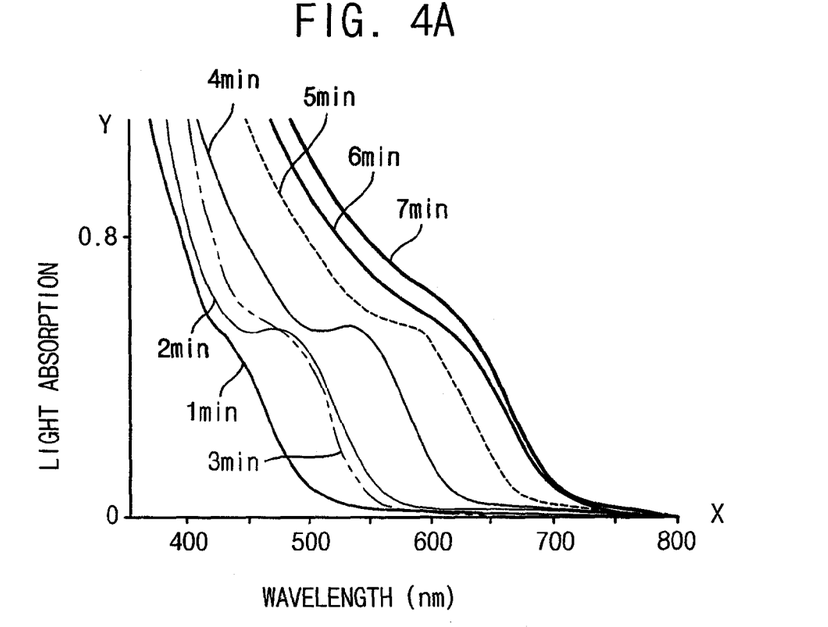
FIGS. 4A and 4B are graphs illustrating characteristics of the nanoparticles produced according to Example 2.
Figure 4B:
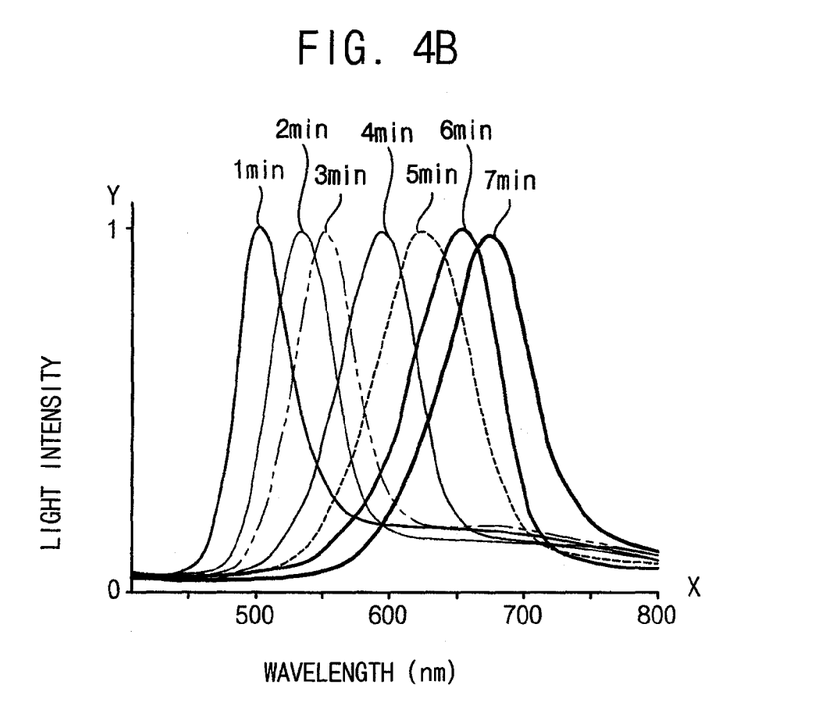

FIGS. 4A and 4B are graphs illustrating characteristics of the nanoparticles according to Example 2.

FIG. 4A represents a light absorption of InP/ZnS in PEG according to the wavelength, when a reaction time is about 1 minute, about 2 minutes, about 3 minutes, about 4 minutes, about 5 minutes, about 6 minutes, and about 7 minutes. In FIG. 4A, the x-axis represents the wavelength (nanometers, nm). The y-axis represents relative light absorption which has a maximum value "1" and a minimum value "0". The reaction time indicates the period in which the precursor of ZnS reacts in PEG and InP after the precursor is added to PEG and InP.

Referring to 4A, the wavelength having the light absorption of about 0 may be increased, as the reaction time passes from about 1 minute to about 7 minutes. When the reaction time is about 1 minute, the light absorption is about 0 at the wavelength of about 600 nm. When the reaction time is about 2 minutes, the light absorption is about 0 at the wavelength of about 620 nm. When the reaction time is about 7 minutes, the light absorption is about 0 at the wavelength of about 800 nm.

FIG. 4B represents the intensity of light emitted from InP/ZnS in PEG according to the wavelength when the reaction time is at about 1 minute, about 2 minutes, about 3 minutes, about 4 minutes, about 5 minutes, about 6 minutes, and about 7 minutes. In FIG. 2B, the x-axis represents the wavelength (nanometers, nm). The y-axis represents relative light intensity which has a maximum value "1" and a minimum value "0".

Referring to FIG. 4B, wavelength having the light intensity of about 1 may increase as the reaction time increases from about 1 minute to about 5 minutes. When the reaction time is about 1 minute, the light intensity is about 1 at the wavelength of about 500 nm. When the reaction time is about 2 minutes, the light intensity is about 1 at the wavelength of about 530 nm. When the reaction time is about 3 minutes, the light intensity is about 1 at the wavelength of about 560 nm. When the reaction time is about 4 minutes, the light intensity is about 1 at the wavelength of about 600 nm. When the reaction time is about 5 minutes, the light intensity is about 1 at the wavelength of about 630 nm. When the reaction time is about 6 minutes, the light intensity is about 1 at the wavelength of about 660 nm. When the reaction time is about 7 minutes, the light intensity is about 1 at the wavelength of about 680 nm.

In FIGS. 4A and 4B, the nanoparticle formed in PEG absorbs and emits light of increasing wavelength as the reaction time increases. The size of the nanoparticle may grow large, as the reaction time passes. The nanoparticle may represent a blue color corresponding to the short wavelength to a red color corresponding to the long wavelength, as the size of the nanoparticle is increased.

Hereinafter, a method for manufacturing a light-emitting element will be explained referring to FIGS. 5 to 8.

Figure 5:
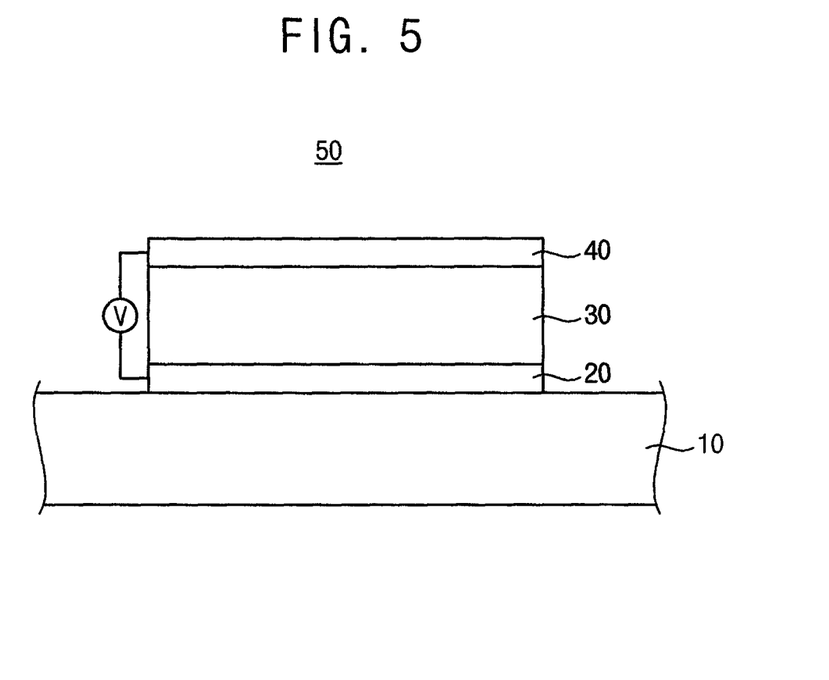
FIG. 5 is a cross-sectional view illustrating a light-emitting element according to another embodiment of the present invention.

FIG. 5 is a cross-sectional view illustrating a light-emitting element in a method for manufacturing the light-emitting element according to another embodiment of the present invention.

First, the light-emitting element will be briefly explained as follows. Referring to FIG. 5, the light-emitting element 500 may include a first electrode layer 20 formed on a substrate 10, a light-emitting layer 30 formed on the first electrode layer 20, and a second electrode layer 40 formed on the light-emitting layer 30.

The first electrode layer 20 may provide a hole for the light-emitting layer 30. The second electrode layer 40 may provide an electron for the light-emitting layer 30.

A hole and an electron combine in the light-emitting layer 30 to emit light. The light-emitting layer 30 may include a plurality of nanoparticles. Examples of a material that may be used for the nanoparticle may include gold (Au), silver (Ag), platinum (Pt), palladium (Pd), cobalt (Co), copper (Cu), molybdenum (Mo), indium phosphide (InP), cadmium selenide (CdSe), copper indium selenide ($CuInSe_2$), copper indium sulfide ($CuInS_2$), gold indium sulfide ($AgInS_2$), indium phosphide/zinc sulfide (InP/ZnS), etc.

Although not shown in the figures, the light-emitting element 50 may further include a hole injection layer and/or a hole transferring layer which are disposed between the first electrode layer 20 and the light-emitting layer 30. In addition, the light-emitting layer 50 may further include an electron injection layer and/or an electron transferring layer which are disposed between the second electrode layer 40 and the light-emitting layer 30.

Referring to FIG. 5, the method for manufacturing the light-emitting element will be explained as follows. First, the nanoparticles are formed using PEG A method for forming the nanoparticle according to the present embodiment is substantially the same as the method according to the previous embodiment in FIG. 1. Thus, any further repetitive description will be omitted.

The nanoparticle may be coated on the substrate 10 including the first electrode layer 20 to form the light-emitting layer 30. For example, a solution including the nanoparticle may be dropped on the substrate 10 including the first electrode layer 20 and a solvent of the solution may be evaporated from the substrate 10. Then, the nanoparticle may remain on the substrate 10 to form the light-emitting layer 30. Then, the second electrode layer 40 is formed on the substrate 10 including the light-emitting layer 30 to manufacture the light-emitting element 50 according to the present embodiment.

Figure 6:
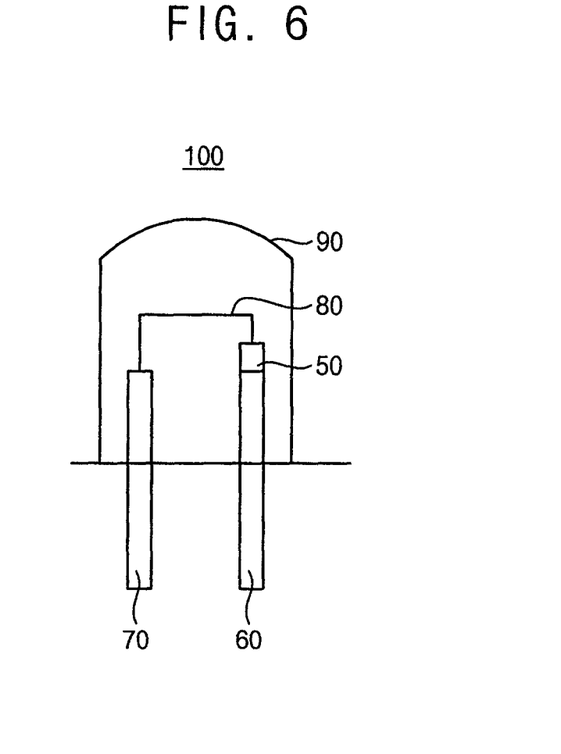
FIG. 6 is a cross-sectional view illustrating a light source including the light-emitting element of FIG. 5.

FIG. 6 is a cross-sectional view illustrating a light source including the light-emitting element 50 of FIG. 5.

Referring to FIG. 6, the light-emitting element 50 according to the present example embodiment may be used in a light source 100. The light source 100 may include a light-emitting element 50 as explained in FIG. 5, a first electrode line 60, a second electrode line 70, a wire 80, and lens 90.

The light-emitting element 50 according to the present embodiment is substantially the same as the light-emitting element according to the embodiment in FIG. 5. The first electrode line 60 may be electrically connected to the first electrode layer 20 of the light-emitting element 50. The second electrode line 70 may face the first electrode line 60 and be electrically connected to the second electrode layer 40 of the light-emitting element 50 through the wire 80. The lens 90 may cover the light-emitting element 50, the first electrode line 60, the second electrode line 70, and the wire 80, and diffuse the light emitted from the light-emitting element 50.

The light source 100 including the light-emitting element 50 is manufactured using a nanoparticle which is formed in PEG In a method for manufacturing the light source 100, a method for forming the light-emitting element 50 according to the present embodiment is substantially the same as the light-emitting element according to the previous example embodiment in FIG. 5. The light-emitting element 50 may be combined with the first electrode line 60, the second electrode line 70, the wire 80, and the lens 50 to manufacture the light source 100.

Figure 7:
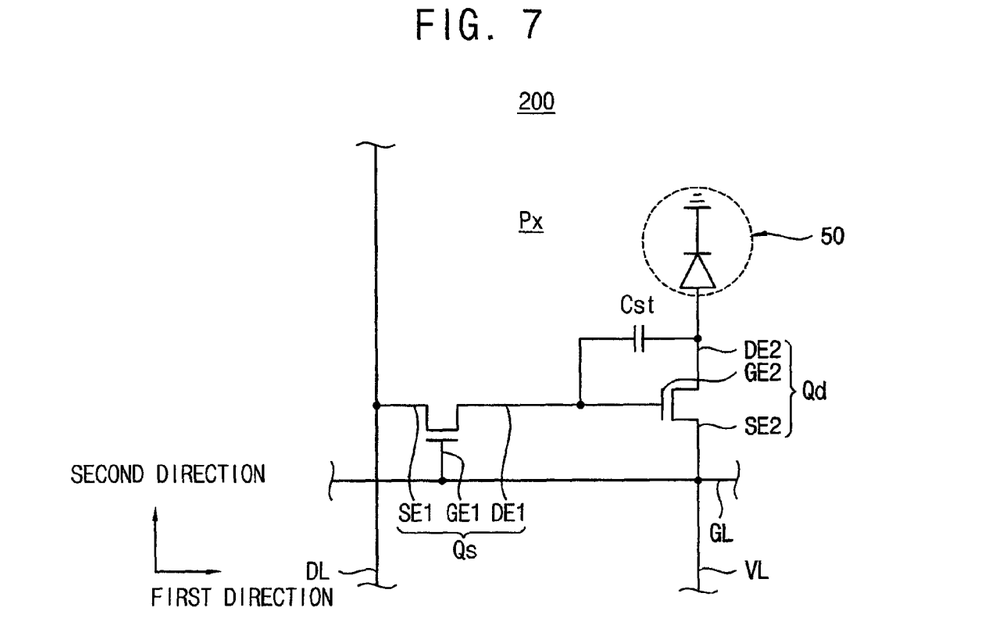
FIG. 7 is a circuit diagram illustrating a display substrate in a method for manufacturing the display substrate according to still another embodiment of the present invention.

FIG. 7 is a circuit diagram illustrating a display substrate in a method for manufacturing the display substrate according to still another example embodiment of the present invention.

Referring to FIG. 7, a display substrate 200 may include a gate line GL, a data line DL, a power supply line VL, a switching transistor Qs, a driving transistor Qd, and a light-emitting element 50. Each pixel area Px of the display substrate 200 may include the switching transistor Qs, the driving transistor Qd, the light-emitting element 50, and a storage capacitor Cst.

The gate line may extend in a first direction of the display substrate 200. The data line DL may extend in a second direction different from the first direction and cross the gate line GL. The gate line GL and the data line DL may be connected to the switching transistor Qs. The power supply line VL may extend in the first direction and be disposed parallel with the gate line GL. The power supply line VL may be connected to the driving transistor Qd. The driving transistor may be connected to the switching transistor Qs.

The switching transistor Qs may include a first gate electrode GE1 connected to the gate line GL, a first source electrode SE1 connected to the data line DL1, and a first drain electrode DE1 spaced apart from the first source electrode SE1.

The driving transistor Qd may include a second gate electrode GE2 connected to the first drain electrode DE1, a second source electrode SE2 connected to the power supply line VL, and a second drain electrode DE2 spaced apart from the second source electrode SE2.

The light-emitting element 50 may include a first electrode layer, a light-emitting layer, and a second electrode layer. The light-emitting element 50 according to the present embodiment is substantially the same as the light-emitting element according to the embodiment in FIG. 5.

Figure 8:
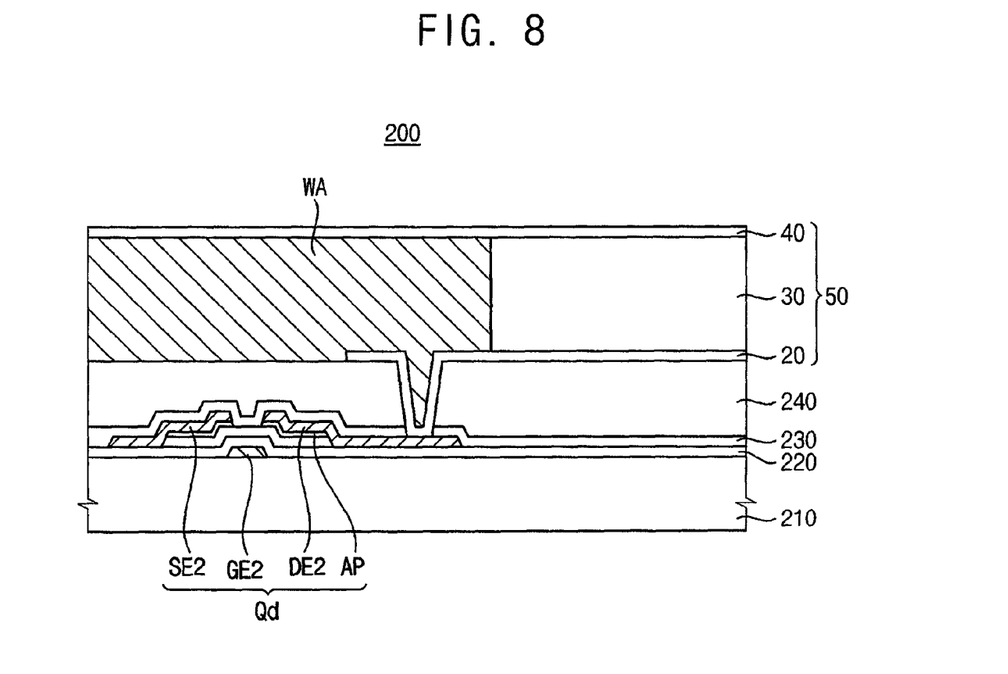
FIG. 8 is a cross-sectional view illustrating the display substrate in FIG. 7.

FIG. 8 is a cross-sectional view illustrating the display substrate in FIG. 7.

Referring to FIG. 8, a method for manufacturing of a display substrate including a light-emitting element will be explained. The first and second gate electrodes GE1 and GE2 may be formed on a base substrate 210. A first insulating layer 220 may be formed on the base substrate 210 including the first and second electrodes GE1 and GE2. An active pattern AP of the driving transistor Qd may be formed on the base substrate 210 including the first insulating layer 220. The first and second source electrodes SE1 and SE2 and the first and second drain electrodes DE1 and DE2 may be formed on the base substrate 210 including the active pattern AP. A second insulating layer 230 and a third insulating layer 240 may be formed on the base substrate 210 including the first and second source electrodes SE1 and SE2 and the first and second drain electrodes DE1 and DE2. The first electrode layer 20 may be formed on the third insulating layer 240. In forming the first electrode layer 20, the first drain electrode DE1 may be electrically connected to the second gate electrode GE2.

Then, an insulating wall WA may be formed in a region of the display substrate 200 except for the pixel area Px, and is formed on the base substrate 210 on which the first electrode layer 20 is formed. For example, the insulating wall WA may be formed in the region in which the gate line GL and the data line DL are formed.

A light-emitting layer 30 may be formed on the base substrate 210 including the insulating wall WA via coating a nanoparticle. Forming the light-emitting layer 30 according to the present embodiment is substantially the same as the process described above for the embodiment in FIG. 5. Thus, any further repetitive description will be omitted.

A second electrode layer 40 may be formed on the base substrate 210 including the light-emitting layer 50 to manufacture the display substrate 200 including the light-emitting element 50.

Figure 9:
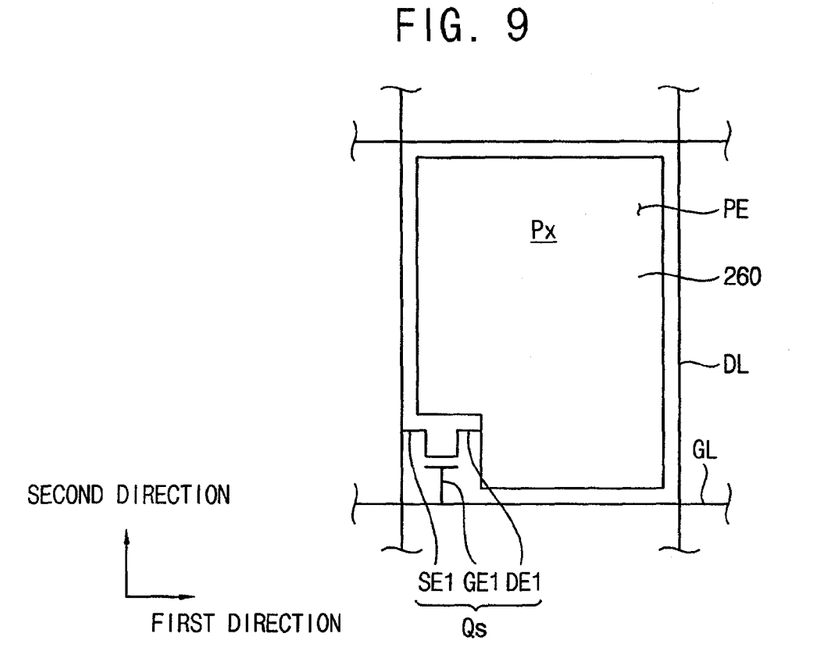
FIG. 9 is a plan view illustrating the display substrate in FIG. 7.
Figure 10:
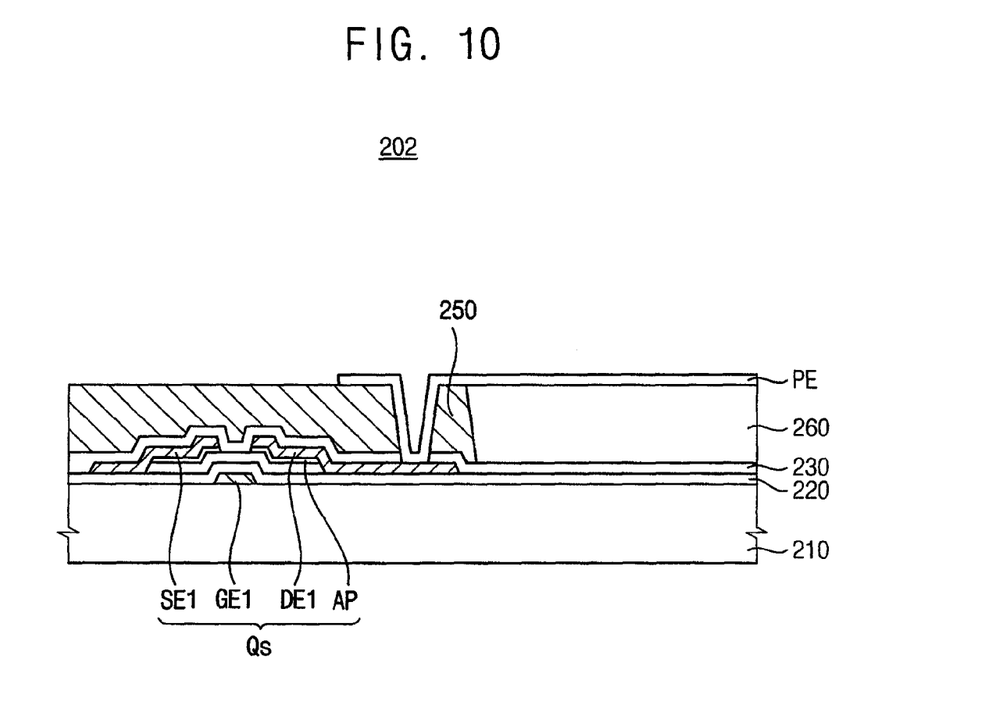
FIG. 10 is a cross-sectional view illustrating the method for manufacturing the display substrate shown in FIG. 9.

FIG. 9 is a plan view illustrating the display substrate in FIG. 7. FIG. 10 is a cross-sectional view illustrating the method for manufacturing the display substrate shown in FIG. 9.

Referring to FIGS. 9 and 10, a display substrate 202 according to the present embodiment may include a gate line GL, a data line DL, a switching transistor Qs, a light-blocking pattern 250, a color layer 260, and a pixel electrode PE. Each pixel area Px may include the switching transistor Qs, the color layer 260, and a storage capacitor Cst.

The gate line GL may extend in a first direction of the display substrate 202. The data line DL may extend in a second direction different from the first direction and cross the gate line GL. The gate line GL and the data line DL may be connected to the switching transistor Qs. The switching transistor Qs may include a first gate electrode GE1 connected to the gate line GL, a first source electrode SE1 connected to the data line DL1, and a first drain electrode DE1 spaced apart from the first source electrode SE1.

The light-blocking pattern 250 may be formed in a region of the base substrate 210 corresponding to the gate line GL, the data line DL, and the switching transistor Qs.

The color layer 260 may be formed on a second insulting layer 230 formed on the base substrate 210 on which the first source and drain electrodes SE1 and DE1 are formed. The color layer 260 may include a plurality of nanoparticles. For example, the nanoparticles may include gold (Au), silver (Ag), platinum (Pt), palladium (Pd), cobalt (Co), copper (Cu), molybdenum (Mo), indium phosphide (InP), cadmium selenide (CdSe), copper indium selenide ($CuInSe_2$), copper indium sulfide ($CuInS_2$), gold indium sulfide ($AgInS_2$), indium phosphide/zinc sulfide (InP/ZnS), etc. Each color of the color layer 260 formed in the pixel areas Px may be different from each other. The color layer 260 having the different colors may depend on the size of the nanoparticle or the kind of transition metal of the nanoparticle.

The pixel electrode PE may be electrically connected to the switching transistor Qs. The pixel electrode PE may be formed on the base substrate 210 on which the color layer 260 having the nanoparticles is formed.

Referring to FIG. 10, a method for manufacturing the display substrate 202 according to the present embodiment will be explained as follows. The switching transistor Qs and the light-blocking pattern 250 may be sequentially formed on the base substrate 210. A nanoparticle formed in PEG may be dropped on the base substrate 210 including the transistor Qs and the light-blocking pattern 250 to form the color layer 260. Forming the nanoparticle according to the present embodiment is substantially the same as the method for manufacturing the nanoparticle according to the previous embodiment described in reference to FIG. 1. Using the nanoparticle formed in PEG to manufacture the color layer 260, the characteristics of the nanoparticle having high color reproducibility may be maintained and costs for manufacturing the nanoparticle may be decreased.

Then, the pixel electrode PE may be formed on the base substrate 210 including the color layer 260 to manufacture the display substrate 202.

Although not shown in the figures, the color layer including the nanoparticle may be formed on another substrate that covers the base substrate 210, which includes the switching transistor Qs and the pixel electrode PE, and may be formed in the pixel area facing the pixel electrode to manufacture a display substrate.

The present invention allows a nanoparticle to be formed using PEG as a solvent. PEG is cheap and less toxic, and PEG used in forming the nanoparticle may be recycled. A method for manufacturing the nanoparticle may be used in a method for manufacturing a light-emitting element, a method for manufacturing a display substrate, etc., and thus the productivity of the light-emitting element and the display substrate may be improved.

The foregoing is illustrative of the present invention and is not to be construed as limiting thereof. Although a few embodiments of the present invention have been described, those skilled in the art will readily appreciate that many modifications are possible in the embodiments without materially departing from the novel teachings and advantages of the present invention. Accordingly, all such modifications are intended to be included within the scope of the present invention as defined in the claims. For example, while only transition metal complex is explicitly disclosed as the precursor in the interest of clarity of description, other substances known to be suitable for nanoparticle production and miscible with PEG is contemplated. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims.

What is claimed is:

1. A method for manufacturing a nanoparticle, the method comprising:
    mixing a precursor with polyethylene glycol (PEG) to form a first mixture,
    wherein the precursor comprises a first transition metal complex comprising a first transition metal that forms a core of the nanoparticle;
    thermally decomposing the first mixture to form the core of the nanoparticle in the PEG;
    after thermal decomposition, mixing a hydrophobic solution having a higher hydrophobicity than the PEG into the PEG containing the nanoparticle to dissolve the nanoparticle into the hydrophobic solution and to precipitate the PEG to solid-state PEG;
    separating the solid-state PEG from the hydrophobic solution including the dissolved nanoparticle;
    heating the solid-state PEG to transform solid-state PEG into liquid-state PEG; and
    reusing the liquid-state PEG to manufacture another nanoparticle.

2. The method of claim 1, wherein the first mixture is thermally decomposed by agitation at a temperature in a range of about 100° C. to about 300° C.

3. The method of claim 1, wherein the first mixture is collected via transforming a phase of solid-state PEG.

4. The method of claim 1, wherein the hydrophobic solution comprises one of hexane, chloroform, and cyclohexane.

5. The method of claim 1, wherein the nanoparticle comprises one of indium phosphide (InP) and cadmium selenide (CdSe).

6. The method of claim 1, further comprising forming an outer layer on the nanoparticle using a second transition metal complex,
    wherein forming the outer layer comprises:
    mixing the second transition metal complex with the first mixture after thermal decomposition to form a second mixture; and
    thermally decomposing the second mixture.

7. The method of claim 6, further comprising:
    mixing the thermally decomposed second mixture including the nanoparticle with the outer layer with a hydrophobic solution having a higher hydrophobicity than the PEG; and
    separating solid-state PEG from the nanoparticle with the outer layer by precipitating the solid-state PEG in the hydrophobic solution.

8. The method of claim 7, wherein the first mixture is collected via transforming a phase of solid-state PEG.

9. The method of claim 6, wherein the outer layer comprises zinc sulfide (ZnS).

10. The method of claim 1, wherein the nanoparticle comprises at least one of transition metal oxide, transition metal sulfide, transition metal selenide, transition metal telluride, transition metal nitride, transition metal phosphide, and transition metal arsenide.

11. The method of claim 10, wherein the transition metal comprises at least one of zinc (Zn), cadmium (Cd), mercury (Hg), gallium (Ga), indium (In), tin (Sn), lead (Pb), and copper (Cu).

12. A method for manufacturing a light-emitting element, the method comprising:
    thermally decomposing a first mixture including a precursor mixed with PEG to form a nanoparticle, wherein the precursor comprises a first transition metal complex comprising a first transition metal that forms a core of a nanoparticle;
    forming a first electrode layer on a substrate;
    forming a light-emitting layer having the nanoparticle on the first electrode layer; and
    forming a second electrode layer on the light-emitting layer,
    after thermal decomposition, mixing a hydrophobic solution having a higher hydrophobicity than the PEG into the PEG containing the nanoparticle to dissolve the nanoparticle into the hydrophobic solution and to precipitate the PEG to solid-state PEG;
    separating solid-state PEG from the hydrophobic solution including the nanoparticle;
    heating the solid-state PEG to transform solid-state PEG into liquid-state PEG; and
    reusing the liquid-state PEG to manufacture another nanoparticle.

13. The method of claim 12, wherein the first mixture is collected via transforming a phase of solid-state PEG.

14. A method for manufacturing a display substrate, the method comprising:
    thermally decomposing a first mixture including a precursor mixed with PEG to form a nanoparticle, wherein the precursor comprises a first transition metal complex comprising a first transition metal that forms a core of the nanoparticle;
    forming a color layer disposing the nanoparticle in a pixel area of a substrate,
    after thermal decomposition, mixing a hydrophobic solution having a higher hydrophobicity than PEG into the PEG containing the nanoparticle to dissolve the nanoparticle into the hydrophobic solution and to precipitate the PEG to solid-state PEG;
    separating solid-state PEG from hydrophobic solution including the nanoparticle;
    heating the solid-state PEG to transform solid-state PEG into liquid-state PEG; and
    reusing the liquid-state PEG to manufacture another nanoparticle.

15. The method of claim 14, wherein the first mixture is collected via transforming the phase of solid-state PEG.

* * * * *